April 19, 1949.　　　　M. R. FOULKE　　　　2,467,932
WHEELED SLED-A SUMMER SLED
Filed Oct. 4, 1947
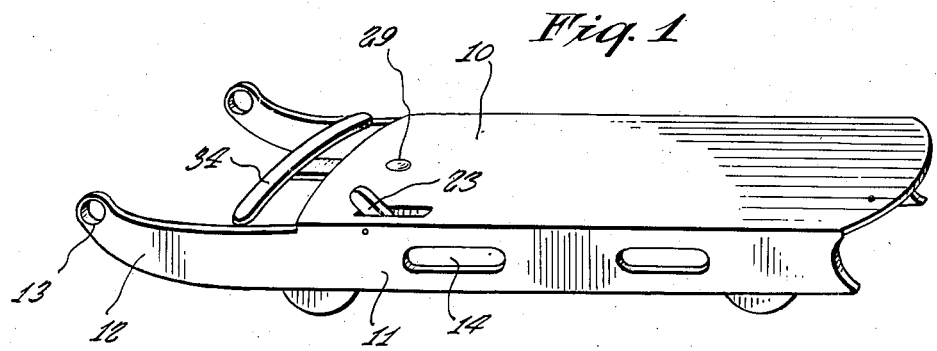
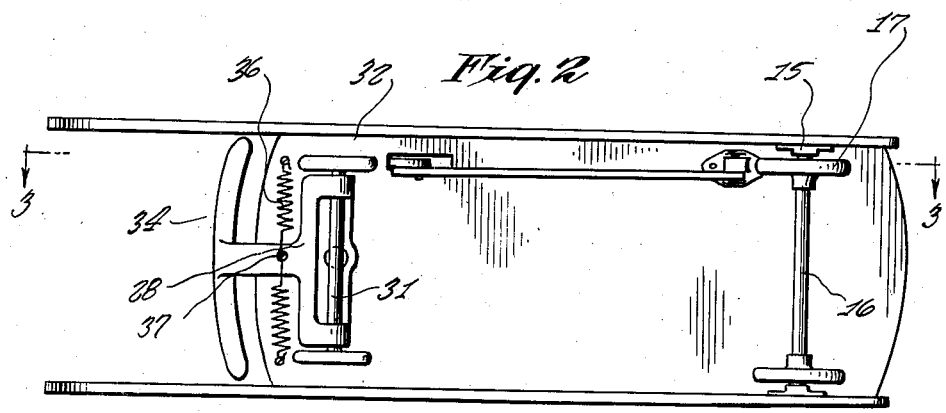
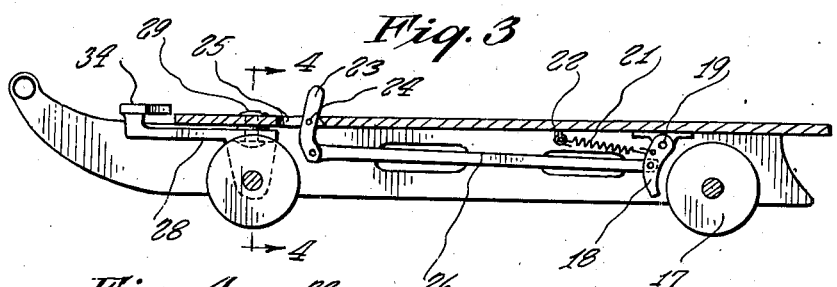
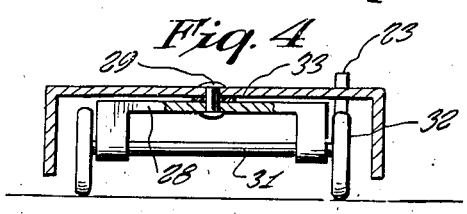
INVENTOR.
MILLER ROSS FOULKE
BY
Carl Miller
ATTORNEY Patented Apr. 19, 1949

2,467,932

UNITED STATES PATENT OFFICE 2,467,932

WHEELED SLED—A SUMMER SLED

Miller Ross Foulke, Brooklyn, N. Y.

Application October 4, 1947, Serial No. 777,918

1 Claim. (Cl. 280—87.01)

This invention relates to a wheeled sled.

It is an object of the present invention to provide a sled which has wheels thereon whereby the same can be used for coasting without snow and wherein the body is of the same shape as an ordinary sled and adapted for use in the same manner that a sled is used with extensions thereon for receiving a rope whereby the sled may be pulled.

Other objects of the present invention are to provide a coaster sled with wheels thereon which is of simple construction, has a simple steering mechanism, which is inexpensive to manufacture and convenient to use.

For other objects and for a better understanding of the invention, reference may be had to the following detailed description, taken in connection with the accompanying drawing, in which Fig. 1 is a perspective view of the wheeled sled embodying the features of the present invention.

Fig. 2 is a bottom plan view of the wheeled sled.

Fig. 3 is a longitudinal cross-sectional view taken on line 3—3 of Fig. 2.

Fig. 4 is a transverse cross-sectional view taken on line 4—4 of Fig. 3.

Referring now to the figures, 10 represents a sled body having sides 11 with extensions 12 thereon through holes 13 of which a rope may be extended to pull the sled over the ground. The sides 11 of the sled have hand holes 14 by which the sled can be grasped to start the coasting action. On bearing brackets 15 on the inner faces of the sides 11 is a wheel axle 16 having rear wheels 17 thereon. A brake element 18 is pivoted at 19 on a bracket and is normally held in a position removed from the wheel by a tension spring 21 anchored to the sled at 22. A brake lever 23 is pivoted at 24 and extends upwardly through a slot 25 and can be operated from the top of the sled and connected by a rod 26 with the brake 18.

A steerable front wheel structure 28 is pivoted by a pin 29 to the forward part of the sled. A shaft 31 with wheels 32 thereon is carried on this steerable structure. A washer 33 surrounds the pivot pin 29 and extends between the sled top and the steerable structure 28.

The steerable structure 28 has a forward extension 34 in the form of a transversely extending handle which extends ahead of the sled top and can be grasped by the user of the sled.

Balance springs 36 are connected to the structure 34 at 37 and will tend to bring the steerable structure to a center position and the steering of the structure 28 will be against the action of these springs.

While various changes may be made in the detail construction, it shall be understood that such changes shall be within the spirit and scope of the present invention as defined by the appended claim.

Having thus set forth and disclosed the nature of my invention, what is claimed is:

A wheeled sled comprising a top and side portions with extensions extending forwardly of the top, rear wheels extending between the sides at the rear thereof and below the bottom edges of the same, and a steerable structure pivotally connected to the forward portion of the sled and to the under face of the top thereof and including a frame, an axle extending through the frame with wheels thereon, said frame having a forward extension extending forwardly and ahead of the top of the sled, a cross arm on the forward extension extending between and above the side portions which can be grasped to effect a steering operation, and balance spring means connected between the top of the sled and the forward extension of the wheel frame.

MILLER ROSS FOULKE.

REFERENCES CITED

The following references are of record in the file of this patent:

UNITED STATES PATENTS

| Number | Name | Date |
|---|---|---|
| 967,423 | Orcutt | Aug. 16, 1910 |
| 1,123,676 | Bule | Jan. 5, 1915 |
| 1,364,612 | Church | Jan. 4, 1921 |
| 1,440,012 | James | Dec. 26, 1922 |
| 1,810,997 | Bauer | June 23, 1931 |